United States Patent
Samwel, III et al.

(10) Patent No.: US 9,298,983 B2
(45) Date of Patent: *Mar. 29, 2016

(54) SYSTEM AND METHOD FOR DOCUMENT GROUPING AND USER INTERFACE

(71) Applicant: Array Technology, LLC, Oklahoma City, OK (US)

(72) Inventors: Peter M. Samwel, III, Oklahoma City, OK (US); Nathan B. Lorenz, Oklahoma City, OK (US)

(73) Assignee: Array Technology, LLC, Oklahoma City, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 14/466,715

(22) Filed: Aug. 22, 2014

(65) Prior Publication Data

US 2015/0206007 A1     Jul. 23, 2015

Related U.S. Application Data

(63) Continuation of application No. 14/159,110, filed on Jan. 20, 2014, now Pat. No. 8,837,835.

(51) Int. Cl.
*G06K 9/46*       (2006.01)
*G06K 9/00*       (2006.01)

(52) U.S. Cl.
CPC .................................. *G06K 9/00483* (2013.01)

(58) Field of Classification Search
USPC .................. 1/1; 382/103; 707/705, 737, 802; 715/850
See application file for complete search history.

(56) References Cited

U.S. PATENT DOCUMENTS

| 5,465,353 | A |   | 11/1995 | Hull et al. |
| 6,018,735 | A | * | 1/2000 | Hunter |
| 6,137,911 | A |   | 10/2000 | Zhilyaev |
| 7,039,637 | B2 |  | 5/2006 | Murray et al. |

(Continued)

FOREIGN PATENT DOCUMENTS

| AU | 2000/19073 A1 | 6/2000 |
| EP | 1210669 A1 | 6/2002 |

(Continued)

OTHER PUBLICATIONS

D. Doermann et al., *The Development of a General Framework for Intelligent Document Image Retrieval*, CAR-TR-835, CS-TR-3678, MDA 9049-3C-7217, Aug. 1996.

(Continued)

*Primary Examiner* — Vikkram Bali
*Assistant Examiner* — Xuemei Chen
(74) *Attorney, Agent, or Firm* — Knobbe, Martens, Olson & Bear, LLP

(57) ABSTRACT

Systems and methods for grouping documents and/or displaying groupings are described herein. Documents may be grouped by their document character features. Document character features may include distinct character types, character counts, common character counts, character difference counts, missing character counts, and any combination thereof. Document matches may be based on a threshold value compared to a score and/or indicator based on document character features. The computing devices described herein may generate user interfaces for displaying clusters of documents. The clusters of documents may indicate matches between documents based on the document character features.

20 Claims, 11 Drawing Sheets

(56) References Cited

U.S. PATENT DOCUMENTS

| | | | |
|---|---|---|---|
| 7,373,612 B2 * | 5/2008 | Risch et al. | 715/850 |
| 7,386,560 B2 * | 6/2008 | Tan | 707/737 |
| 7,747,593 B2 * | 6/2010 | Patterson et al. | 707/705 |
| 8,099,401 B1 | 1/2012 | Hsu et al. | |
| 8,127,279 B2 | 2/2012 | Boltz et al. | |
| 8,145,677 B2 * | 3/2012 | Al-Shameri | 707/802 |
| 8,239,750 B2 | 8/2012 | Thomsen | |
| 8,265,347 B2 | 9/2012 | Zhang et al. | |
| 8,311,805 B2 | 11/2012 | Parikh | |
| 8,321,393 B2 | 11/2012 | Adams et al. | |
| 8,335,827 B2 | 12/2012 | Mishchenko | |
| 8,380,718 B2 | 2/2013 | Gallivan et al. | |
| 8,504,374 B2 | 8/2013 | Potter | |
| 8,595,234 B2 | 11/2013 | Siripurapu et al. | |
| 2002/0077940 A1 | 6/2002 | Riley | |
| 2003/0009447 A1 | 1/2003 | Murray et al. | |
| 2004/0243601 A1 | 12/2004 | Toshima | |
| 2005/0060643 A1 | 3/2005 | Glass et al. | |
| 2006/0184357 A1 | 8/2006 | Ramsey et al. | |
| 2007/0217691 A1 | 9/2007 | Newcomer et al. | |
| 2007/0244882 A1 | 10/2007 | Cha et al. | |
| 2008/0123901 A1 * | 5/2008 | Podilchuk | 382/103 |
| 2009/0271359 A1 | 10/2009 | Bayliss | |
| 2011/0093464 A1 | 4/2011 | Cvet et al. | |
| 2011/0131205 A1 | 6/2011 | Iyer et al. | |
| 2011/0282858 A1 | 11/2011 | Karidi et al. | |
| 2012/0221544 A1 | 8/2012 | Hu et al. | |
| 2013/0097166 A1 | 4/2013 | Fink et al. | |
| 2013/0103695 A1 | 4/2013 | Rarrick et al. | |
| 2013/0191468 A1 | 7/2013 | Dichiu et al. | |
| 2013/0236066 A1 | 9/2013 | Shubinsky et al. | |
| 2013/0290338 A1 | 10/2013 | Lee et al. | |
| 2013/0336547 A1 | 12/2013 | Komogortsev | |
| 2014/0019239 A1 | 1/2014 | Qu et al. | |

FOREIGN PATENT DOCUMENTS

| | | |
|---|---|---|
| WO | WO 00/33215 A1 | 6/2000 |
| WO | WO 01/14992 | 3/2001 |

OTHER PUBLICATIONS

X. Luo et al., *A Comparison of SOM Based Document Categorization Systems*, IEEE, Jul. 20-24, 2003.

K. Nyberg, *Document Classification Using Machine Learning and Ontologies*, Aalto University, School of Science, Master's Thesis, Jan. 31, 2011.

International Search Report and Written Opinion dated Mar. 30, 2015, for PCT Application No. PCT/US2015/010325, which is the corresponding PCT application of U.S. Appl. No. 14/159,110.

* cited by examiner

SYSTEM AND METHOD FOR DOCUMENT GROUPING AND USER INTERFACE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/159,110 filed Jan. 20, 2014, which is hereby incorporated by reference in its entirety.

TECHNICAL FIELD

The present disclosure relates generally to the grouping of documents. More particularly, the present disclosure relates to computer processes for grouping documents with identifiable document features.

BACKGROUND

In many industries, large numbers of documents are disorganized. For example, in the world of home loans, loan documents are commonly disorganized and/or exist only in paper format. Those institutions that must service, underwrite, and/or complete due diligence on loan documents, for example, loan underwriters, investors, loan marketplaces, loan advisors, etc., must convert loan documents to digital format, properly organize, index, and/or name those documents, in order to research and act on them.

Traditional approaches to document organization may include complete human review. For example, a human must review each document and then organize or group the document. For document review of a large number of documents, the review may require many people to complete the task. Additionally, the complete human approach to document organization may be slow.

Other approaches to document organization may include machine learning techniques and systems. A machine learning system may be able to learn from data. Machine learning systems often require human interaction to adjust the system and/or an initial sample data set to train the system. Additionally, many machine learning systems that categorize text documents use keywords and/or key phrases to organize documents.

SUMMARY

Embodiments described herein may be used to group documents.

In some embodiments, a computer-implemented system groups documents. In one embodiment, the system comprises a non-transitory document storage device configured to store a plurality of document data items, where each document data item is associated with a distinct document. The document data items each comprise a plurality of character counts, where each character count corresponds to a number of times a specific character type occurs within the distinct document associated with each document data item in the plurality of document data items. The system further comprises a computerized matching unit comprising one or more hardware processors. The computerized matching unit is adapted to access the non-transitory document storage device and generate a grouping. The grouping comprises a first indicator of the plurality of character counts in common between two or more of the plurality of document data items. The grouping further comprises a second indicator of the plurality of character count variances between two or more of the plurality of document data items. The grouping further comprises a third indicator of missing characters between two or more of the plurality of document data items. The grouping further comprises a combined indicator based on the first indicator, the second indicator, and the third indicator, compared to a threshold indicator. The system further comprises a matching reporting unit adapted to report the grouping generated by the computerized matching unit to a user.

In some embodiments, the first indicator, second indicator, third indicator, and threshold indicator comprise scores. The combined indicator comprises a combined scored based on the first score, the second score, and the third score, compared to the threshold score.

In some embodiments, the system further comprises a naming unit, where the naming unit is adapted to generate a name based on the document data items.

In some embodiments, the system further comprises an indexing unit, where the naming unit is adapted to generate an index based on the document data items.

In some embodiments, the documents comprise loan documents.

In some embodiments, the document data items are character set configurable.

In some embodiments, the non-transitory document storage device is an in memory caching system.

In some embodiments, the combined indicator comprises a determining relationship M between two or more of the plurality of document data items, where M is a formula that comprises constants and the first, second, and third indicators. In some embodiments, the constants may vary based on a first or second grouping.

In some embodiments, a system for grouping documents comprises one or more computing devices comprising one or more hardware processors, programmed, via executable code instructions. When executed, the executable code instructions cause the system to implement a matching unit. The matching unit compares a plurality of document units. The matching unit is adapted to receive as input one or more character features extracted from two or more of the plurality of document units. The one or more features comprise a plurality of character counts from two or more of the plurality of document units. The matching unit is further adapted to generate a grouping. The grouping comprises a first indicator of the plurality of character counts in common between two or more of the plurality of document units. The grouping further comprises a second indicator of the plurality of character count variances between two or more of the plurality of document units. The grouping further comprises a combined indicator based on the first indicator and the second indicator, compared to a threshold indicator. When further executed, the executable code instructions cause the system to implement a matching reporting unit. The matching reporting unit adapted to report the grouping generated by the matching unit.

In some embodiments, the grouping of the matching unit further comprises a third indicator of missing characters between two or more of the plurality of document units. The combined indicator is further based on the third indicator compared to the threshold indicator.

In some embodiments, a non-transitory computer storage system comprises instructions for causing a computer system to group documents. When executed, the instructions extract one or more character features from two or more of a plurality of document units. The one or more character features comprises a plurality of character counts from two or more of the plurality of document units. When further executed, the instructions generate a grouping comprising first indicator of the plurality of character counts in common between two or more of the plurality of document units. The grouping further comprising a second indicator of the plurality of character count variances between two or more of the plurality of document units. The grouping further comprising a third indicator of missing characters between two or more of the plurality of document units. The grouping further comprising a combined indicator based on the first indicator, the second indicator, and the third indicator, compared to a threshold indicator. When further executed, the instructions transmit the grouping based on the combined indicator compared to a threshold indicator.

In some embodiments, a non-transitory computer storage system further comprises instructions for generating a name based on the one or more character features. The name is stored in non-transitory computer storage.

In some embodiments, a non-transitory computer storage system further comprises instructions for generating an index from the one or more character features. The index is stored in non-transitory computer storage.

Additional embodiments, as well as other features of embodiments of the invention, will be apparent from the accompanying drawings and from the descriptions herein. Nothing in this summary or the following detailed description is intended to imply that any feature, component or characterization is essential to the invention.

DETAILED DESCRIPTION OF ILLUSTRATIVE EMBODIMENTS

Systems for grouping documents are described herein. Using the techniques and systems described herein, efficient and faster document grouping may be achieved. Those techniques and systems may include document grouping by character features, not words, such as, for example, character count comparisons, variance count comparisons, and/or missing character counts. Additional advantages and benefits may include lower storage volume, reduced computational resource requirements, and/or the ability to process larger volumes of documents.

Grouping by character features may allow for efficient grouping, organization, document naming, and/or indexing. Grouping by character features may allow for efficient processing and storage. For example, storage of character features may require lower storage volume when compared with storing words and/or strings. Furthermore, processing of character features, such as, but not limited to, character counts, may be faster than sequential processing of words and/or strings.

Additionally, grouping by character features may not require training of the system. For example, document character feature comparisons may compare two or more documents. Such comparisons may not require any training of the system, unlike machine learning systems that require training data sets. As a result, a document grouping system may be deployed and/or installed quickly for new document sets because there may be no training required.

System Overview

Figure 1A:
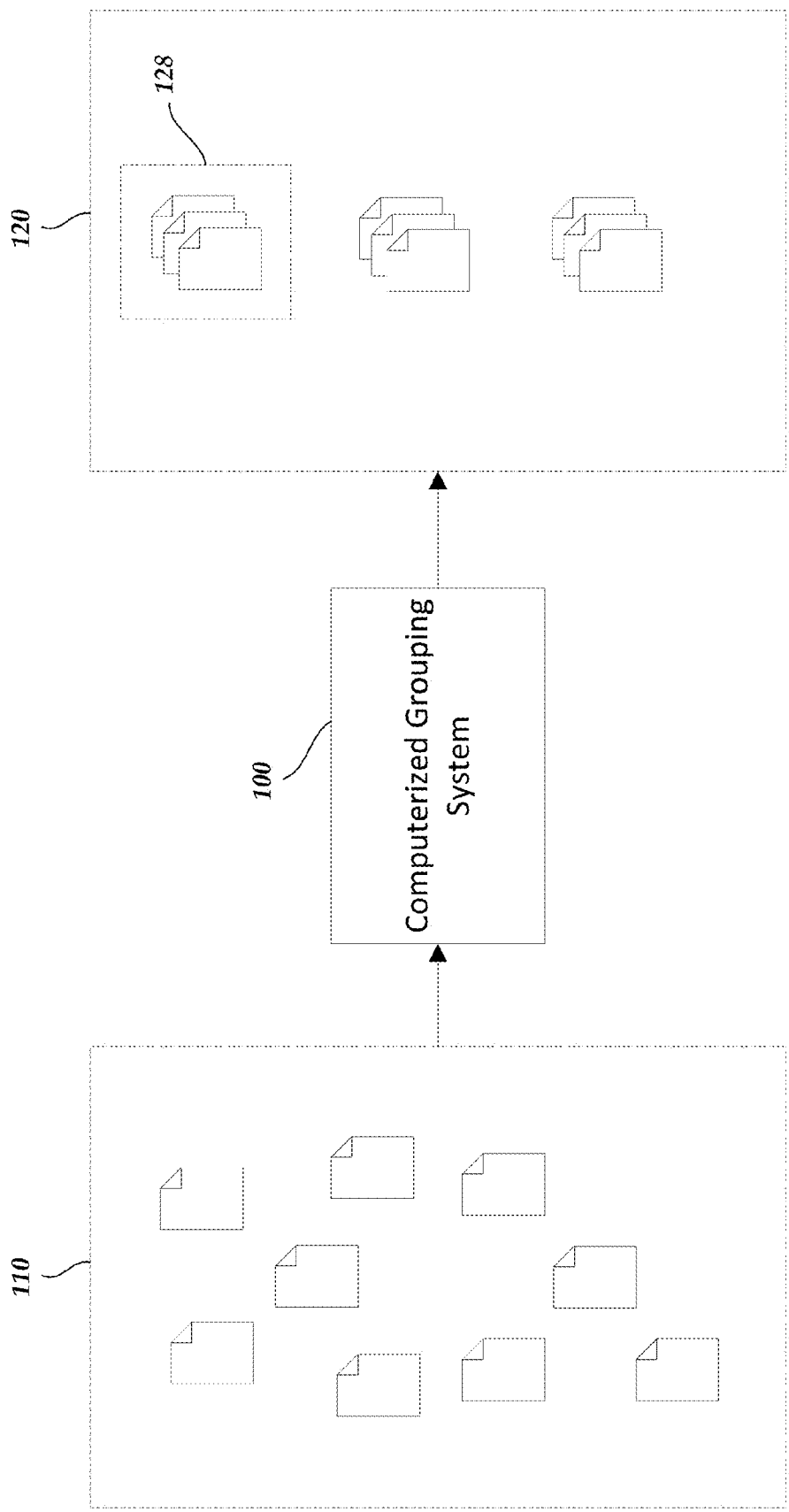
FIG. 1A is a diagram illustrating a computerized grouping system in accordance with some embodiments.

FIG. 1A is a block diagram that illustrates a system in accordance with some embodiments. As shown, the computerized grouping system 100 may receive a set of inputs comprising a plurality documents 110. The plurality of documents 110 may comprise any combination of disorganized, unsorted, unidentified, unnamed, non-indexed, and/or unknown documents. In addition, as some embodiments described herein focus on characters, and not words, the embodiments themselves are language agnostic. Thus, the plurality of documents 110 may be in any language or combination of languages. For example, the plurality of documents 110 may be in English, Mandarin, Spanish, Hindi, Arabic, Portuguese, Bengali, Russian, Japanese, Punjabi, German, or any combination thereof. The computerized grouping system 100 may process the plurality of documents 110 to output the plurality of resulting documents 120. The plurality of resulting documents 120 may be fully or partially grouped, organized, sorted, identified, named, and/or indexed.

In some embodiments, the plurality of documents 110 comprise any combination of physical, tangible, paper, digitized, and/or in digital format. The computerized grouping system 100 may comprise one or more computing devices and/or may be connected to one or more networks. The plurality of resulting documents 120 may be in any combination of physical, tangible, paper, digitized, and/or in digital format.

In some embodiments, there may be some variations of document grouping and/or outputs. For example, the computerized grouping system 100 may group, organize, sort, identify, and/or index documents in a batch or individually. In some embodiments, a resulting document group 128 comprises document identification numbers.

Figure 1B:
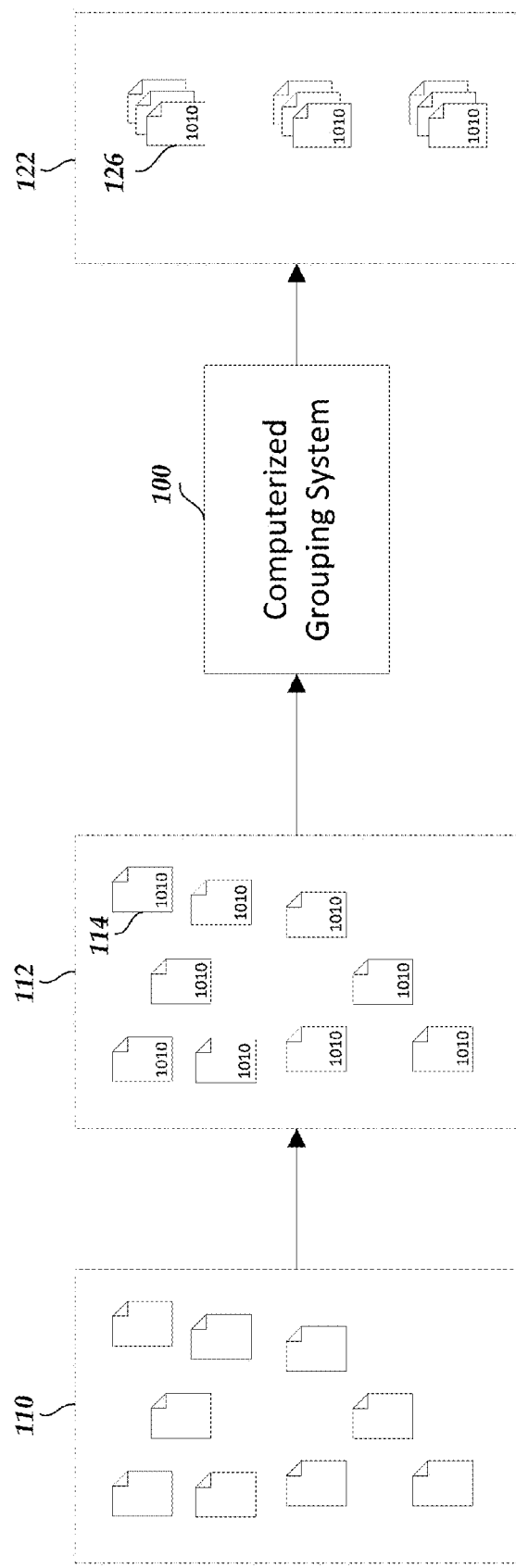
FIG. 1B is a diagram illustrating a computerized grouping system of physical documents in accordance with some embodiments.

As shown in FIG. 1B, in some embodiments, the plurality of documents 110 in physical, tangible, and/or paper form may be scanned, digitized, and/or converted to digital format to comprise a plurality of document units 112. To digitize the documents, one may use many well-known techniques for Optical Character Recognition (OCR), such as pattern matching, pattern recognition, or feature extraction techniques. Many OCR techniques involve pre-processing of an image to improve the chances of a successful recognition. For example, aligning the document properly, removing positive and negative spots, smoothing edges, and/or converting an image from color or greyscale to black and white, etc. The plurality of document units 112 may be further processed as inputs to the computerized grouping system by extracting a plurality of document features. The computerized grouping system 100 may process the plurality of document units 112 to output the plurality of resulting document groups 122. In some embodiments, the computerized grouping system 100 uses the plurality of document features for grouping. These features may include character statistics about the documents, such as character variance, character differential, total characters and missing characters. The plurality of resulting document units 122 may be any combination of grouped, organized, sorted, identified, named, and/or indexed.

In some embodiments, there may be some variations of character feature extraction and/or outputting. For example, the computerized grouping system may group, organize, sort, identify, and/or index a resulting document unit 126 after extracting character features from a corresponding document unit 114. In some embodiments, output of the resulting document units 122 does not begin until completion of processing the plurality of document units 112 by the computerized grouping system 100.

System Architecture

Figure 2:
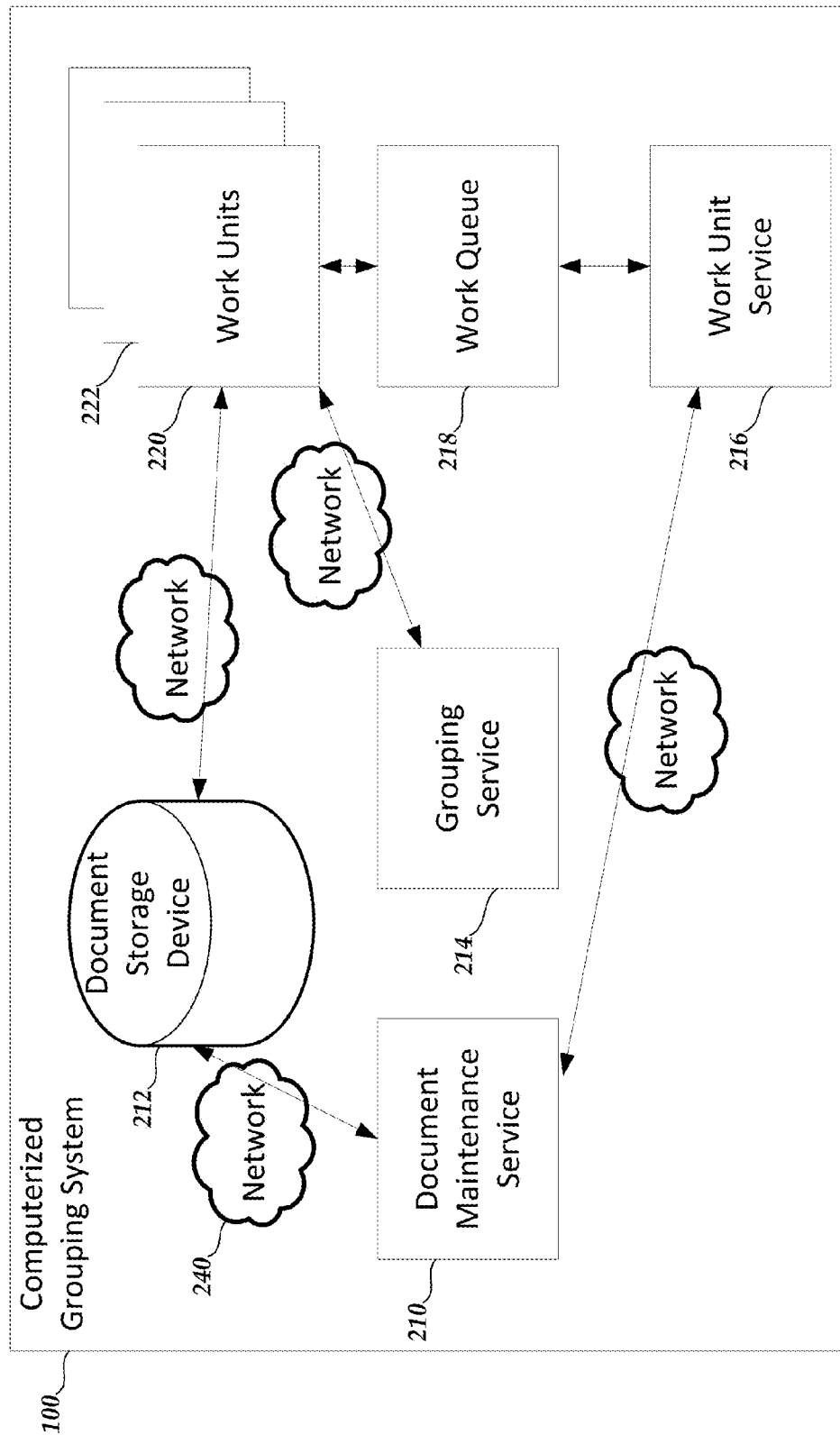
FIG. 2 is a diagram illustrating a computerized grouping system architecture in accordance with some embodiments.

FIG. 2 is a block diagram that illustrates a computerized grouping system in accordance with some embodiments. The computerized grouping system 100 may be connected via a network 240. The network 240 may comprise, but is not limited to, a local area network, wide area network, wireless local area network, wireless wide area network, the Internet, or any combination thereof. In some embodiments, the computerized grouping system 100 comprises a document maintenance service 210, a document storage device 212, a grouping service 214, a work unit service 216, a work queue 218, and/or work units 220.

As shown in FIG. 2, in accordance with some embodiments, the document maintenance service 210 stores document units and/or character features in the document storage device 212. Character features may comprise character counts, character variances, missing characters, and/or other statistics about the document unit. The document maintenance service 210 may be programmed, via executable code instructions, in a programming language such as, but not limited to, C#, C++, C, Java, Lisp, Perl, or PHP. The document maintenance service 210 may be hosted and/or executed on a computing device with one or more hardware processors and with operating system software such as, but not limited to, Windows Server, Windows CE, Unix, Linux, SunOS, or Solaris. In some embodiments, the document storage device 212 comprises a distributed in memory caching system such as, but not limited to, Memcache, Memcached, or Java Caching System. In some embodiments, the document storage device comprises a relational database such as, but not limited to, MySql, Oracle, Sybase, or DB2.

As shown in FIG. 2, in accordance with some embodiments, the document maintenance service 210 sends new document units to the work unit service 216. The work unit service may be hosted on a similar device and/or programmed in a similar programming language as the document maintenance service 210. The work unit service 216 may add document units onto the work queue 218. The work queue 218 may be a first-in-first-out, last-in-first-out, or a priority queue. Document units may be pulled off the work queue 218 to be processed by work units 220 for grouping. The work units 220 may be programmed in a similar programming language as the work unit service 210. The work units 220 may be hosted on a similar device as the work unit service 210. Each document unit may be processed by a work unit 222. The work unit 222 may calculate document features for a document unit, such as the number of times each character occurs in a document, and/or may retrieve document features for a document unit from the document storage device 212. The work unit 222 may calculate document features for a test document and/or may retrieve document features for a test document from the document storage device 212. The work unit 222 may match the document unit and the test document by comparing document features. Match results may be sent to the grouping service 214.

Grouping Process

Figure 3:
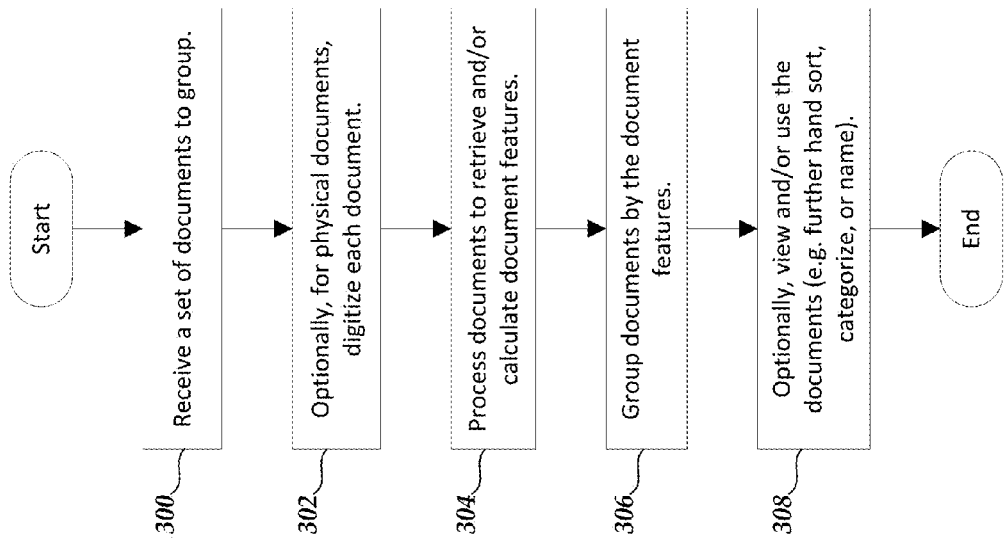
FIG. 3 is a flowchart illustrating a document grouping process according to some embodiments.

FIG. 3 is a flowchart that illustrates a document grouping process according to some embodiments. At block 300, a set of documents may be received to group. The computerized grouping system 100 of FIG. 1A may receive the documents at block 300. The documents at block 300 may correspond to the plurality documents 110 of FIG. 1A. At block 302, physical documents may be scanned, digitized, and/or converted to digital format. The computerized grouping system 100 of FIG. 1A may be configured to scan, digitize, and/or convert physical documents to digital format. At block 304, documents may be processed to retrieve and/or calculate character features. The character features may be retrieved by a service, which may correspond to the document maintenance service 210 of FIG. 2. At block 306, documents may be grouped by character features. The grouping may be performed by a process, which may correspond to the work units 220 of FIG. 2. At block 308, in some embodiments, the documents may be viewed and/or used. Viewing of the documents may be by group. Use of the documents may constitute hand sorting, further categorizing, naming, and/or indexing of the documents. The computerized grouping system 100 of FIG. 1A may further categorize, name, and/or index the documents.

In accordance with some embodiments, there may be some variations of receiving documents to group. For example, as each document is received it may be processed. In some embodiments, processing of documents at block 304 does not begin until receipt of documents at block 300 completes.

In accordance with some embodiments, there may be some variations of document processing and/or document grouping. For example, after processing each document to retrieve and/or calculate character features, the document may be grouped as described herein. In some embodiments, document grouping at block 306 does not begin until completion of document processing at block 304. The documents received at block 300, may comprise any combination of physical, tangible, paper, digitized, and/or in digital format.

Figure 4:
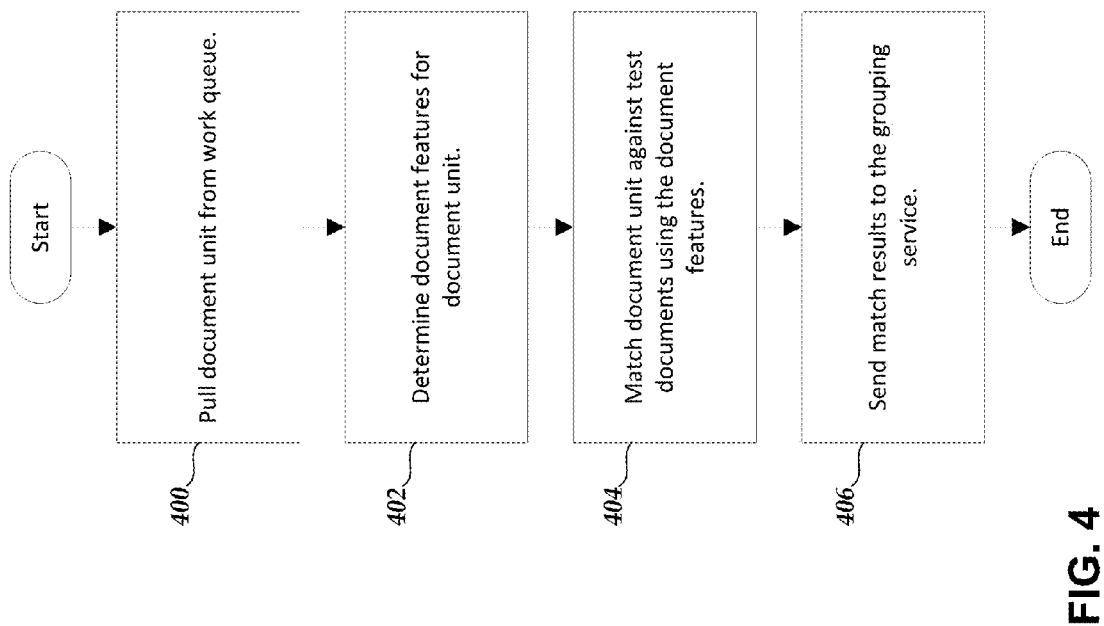
FIG. 4 is a flowchart illustrating a document grouping queue process according to some embodiments.

FIG. 4 is a flowchart that illustrates a document grouping process according to some embodiments. Blocks 400, 402, 404, and 406, in any combination, may correspond to block 306 of FIG. 3. At block 400, a document unit may be pulled from the work queue. The work queue referenced at block 400 may correspond to the work queue 218 of FIG. 2. At block 402, character features may be determined for the document unit. The character features may be determined by a process, which may correspond to the work units 220 of FIG. 2. At block 404, a document may be matched against test documents using the character features of the document and test documents. At block 406, the match results may be sent to a grouping service, which may correspond to the grouping service 214 of FIG. 2.

In accordance with some embodiments, there may be some variations of retrieval and/or calculation of character features. For example, character features of a document unit may be retrieved from a storage device, which may correspond to the document storage device 212 of FIG. 2. Character features may also be retrieved and/or calculated by a process, which may correspond to the work units 220 of FIG. 2. The document features of the test documents may be retrieved and/or calculated by a process, which may correspond to the work units 220 of FIG. 2, and/or retrieved from a storage device, which may correspond to the document storage device 212 of FIG. 2.

In accordance with some embodiments, there may be some variations of match results. For example, at block 406, each document unit match result against a test document may be sent to the grouping service. In some embodiments, at block 406, only match results that resulted in a match may be sent to the grouping service.

Document Character Features

Document features may comprise character counts, character count variances, total characters, missing character counts, and/or other statistics about the document. A document may be comprised of characters. A character may be machine readable only. For example, a document may be comprised of characters that cannot be visually displayed and/or read by a human. A character may be in a character encoding, such as, but not limited to, ASCII, Unicode, Guobiao, or Big5. Thus, a character count may comprise a numerical count of each character in a document. A character count variance may comprise the amount of different characters in a document. A missing character count may comprise the counts of characters that are in a document but not in another document. Other statistics about a document may comprise keywords, key phrases, and/or most common words in a document. In some embodiments, documents may be grouped by other character features and/or other statistics about a document.

Grouping by Character Features

Figure 5:
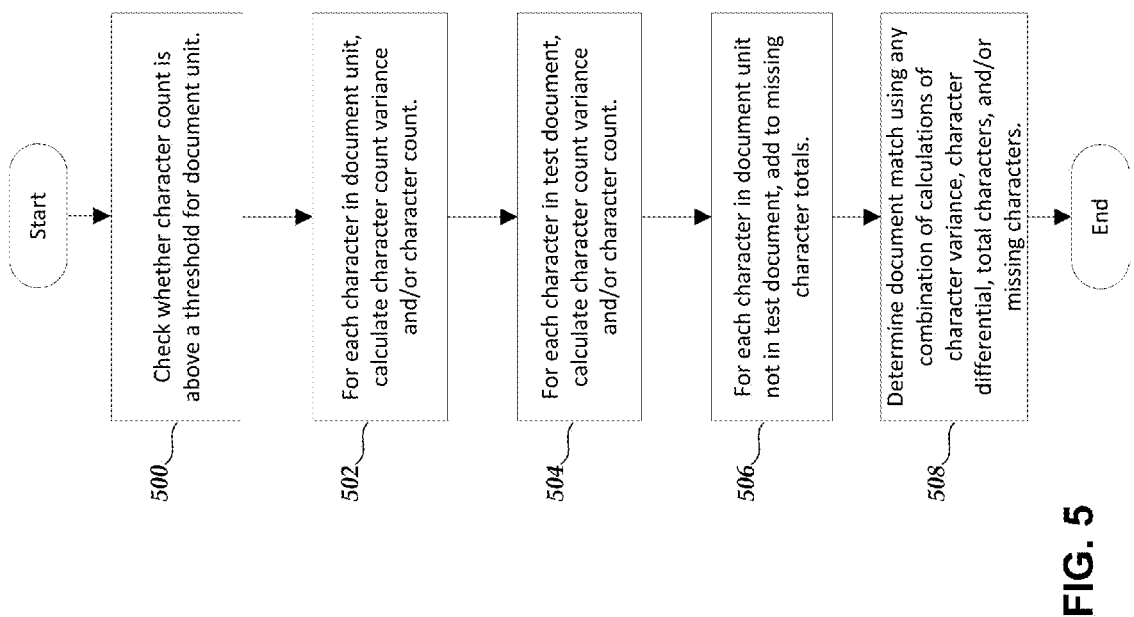
FIG. 5 is a flowchart illustrating a document grouping process by document character features according to some embodiments.

FIG. 5 is a flowchart that illustrates a document grouping process according to some embodiments. Blocks 500, 502, 504, 506, and 508 in any combination, may correspond to all or part of block 404 of FIG. 4. At block 500, a process may check whether the character count for the document unit is above a threshold. For example, a threshold for processing documents may be two, three, four, or many hundred characters. For example, if the character count is below the threshold, the document will not be processed, and if the character count is above the threshold, the document will be processed. At block 502, a process may calculate a character count variance and/or character count for each character in the document unit. At block 504, a process may calculate a character count variance and/or character count for each character in the test document. At block 506, a process may calculate a missing character count for each character in the document unit not in the test document. At block 508, a process may calculate a document match using any combination of character variance counts, character count comparisons, total characters of each character type, and/or missing character counts (for example, a sum of the missing number of character types from a document).

In accordance with some embodiments, there may be some variations of calculation and/or retrieval of character count variances and/or character counts. For example, character count variances and/or character counts for documents may be calculated once and/or cached for retrieval later. In some embodiments, character count variances and/or character counts may be calculated each time a document and/or test document is processed.

In accordance with some embodiments, there may be some variations of what indicates a match. For example, at block 508, a low character count variance between a document unit and a test document may indicate a match. At block 508, a high character count similarity between a document unit and a test document may indicate a match. At block 508, a low missing character count between a document unit and a test document may indicate a match.

In some embodiments, there may be advantages and benefits to grouping documents by documents character features such as, but not limited to, character counts, character count variances, total characters, and/or missing character counts. For example, storing character features, such as character counts, may result in lower storage volume compared to storing words and/or keywords of a document because numerical data types may take less space than string or variable character data types. Lower storage volume may result in greater efficiency by lowering the storage required for businesses to function, and potentially save those businesses money on storage requirements.

Additionally, comparing character features, such as character counts, character count variances, total characters, and/or missing character counts, may result in faster comparisons compared to comparisons by keywords. For example, word and/or keyword comparisons require sequential comparisons of strings and/or characters. By contrast, character count comparisons may require numerical comparisons. Generally, sequential comparisons may be slower and/or take more computational resources than numerical comparisons.

Furthermore, by comparing character features, such as character counts, character count variances, total characters, and/or missing character counts, some embodiments do not require any training of the computerized grouping system. For example, machine learning requires a training set to initialize the machine learning system, whereas grouping documents by character features does not because documents may be compared without any training of the system. Upon each installation of a machine learning system, there may be slow startup and/or installation time because training may be required for a new document set. As a result, a document grouping system may be deployed and/or installed faster than a machine learning system.

Figure 6:
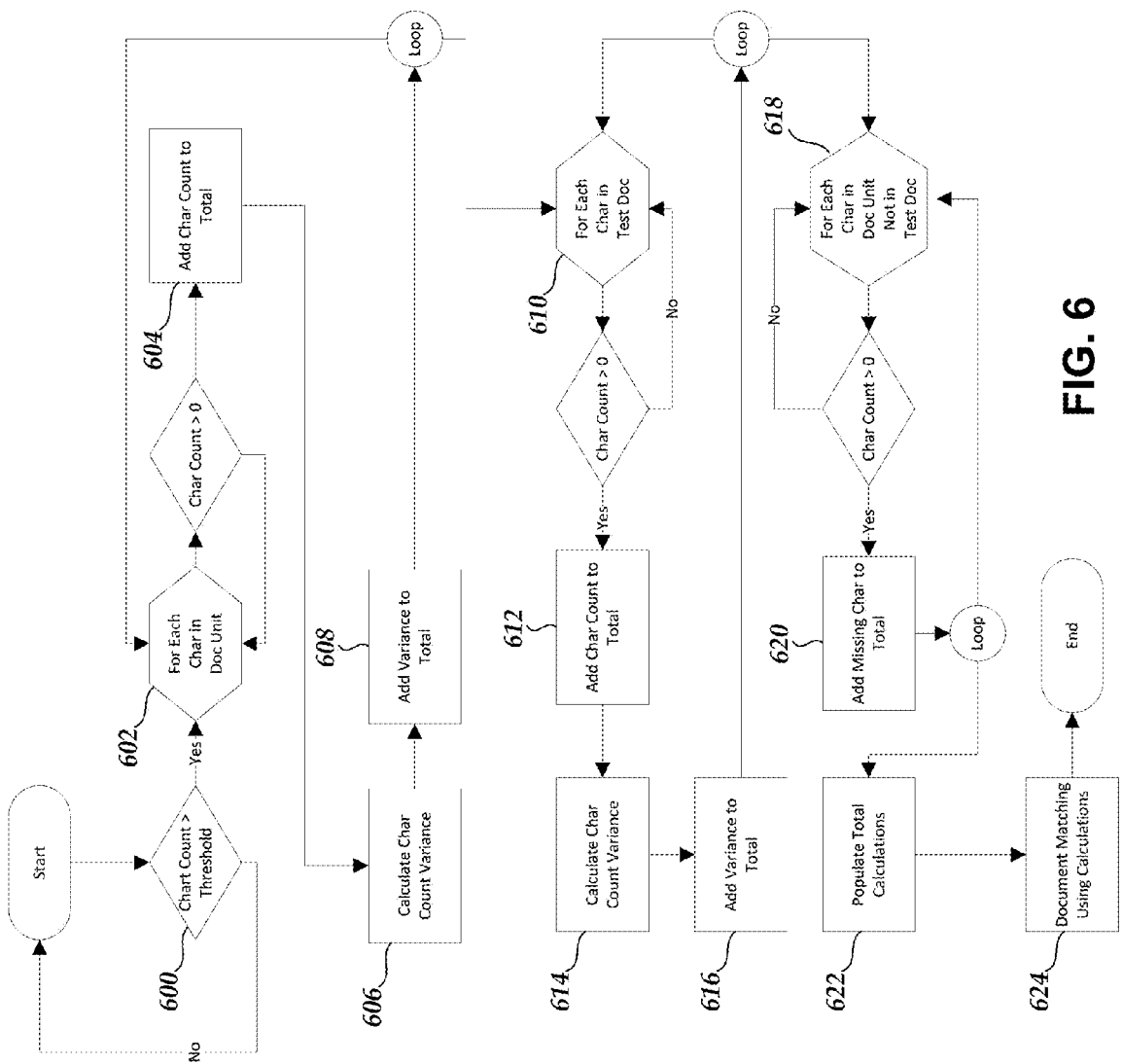
FIG. 6 is a flowchart illustrating a document grouping process by character features according to some embodiments.

FIG. 6 is a flowchart that illustrates a document grouping process according to some embodiments. Blocks 602, 604, 606, 608, 610, 612, 614, 616, 618, 620, 622, and 624 in any combination, may correspond to all or part of block 404 of FIG. 4. At block 602, a process may loop through each character in the document unit. At block 604, a character count for the character from the document unit may be added to a character count total. At block 606, a character variance count for the character from the document unit may be calculated and added to a variance count total. At block 610, a process may loop through each character in the test document. At block 612, a character count for the character from the test document may be added to a character count total. At block 614, a character variance count for the character from the test document may be calculated and added to a variance count total. At block 618, a process may loop through each character in the document unit not in the test document. At block 620, a missing character count may be added to a missing character count total. At block 622, the document unit may be matched against the test document using any combination of character counts, character count variances, total characters, and missing character counts.

In accordance with some embodiments, there may be some variations of the calculation and/or storage of character features. For example, the character count calculation at block 604 and/or character variance count calculation at block 608 of the document unit may be calculated once and/or stored as character features. In some embodiments, the character count calculation at block 610 and/or character variance count calculation at block 616 of the test document unit is calculated once and/or stored as character features. In some embodiments, the character features are retrieved from storage. In some embodiments, character features is calculated each time a document is processed and/or not stored.

In accordance with some embodiments, there may be some variations of document processing. For example, in some embodiments, the test documents may be processed before matching against a document unit. In some embodiments, the processing of document units against test documents, as shown in FIG. 6, is executed by a plurality of concurrent processes. In some embodiments, the processing of each document character is be executed by a plurality of concurrent processes.

Matching Formula

In some embodiments, the document matching, which may correspond to block 508 of FIG. 5, is illustrated by the following math expressions:

D—set of all characters and counts associated with the document unit.
$D_i$—count of character i in D.
T—set of all characters and counts associated with the test document.
$T_i$—count of character i in T.
S—set of all characters and counts associated with the intersection of D and T. In some embodiments, S is the union of D and T.
|S|—cardinality of S.
C—a character comparison.

$$C = \frac{\sum_{i \in S} \frac{T_i}{D_i}}{|S|}$$

$$K_d = \sum_{i \in D} D_i$$

$$K_t = \sum_{i \in T} T_i$$

V—a variance comparison.

$$V = \frac{\sum_{i \in S} \frac{|T_i - D_i|}{K_d + K_t}}{|S|}$$

MC—missing characters. For example, the relative complement of T in D, which may be characters in D not in T.

$$MC = |D^T \cap T|$$

By way of example, a first document may be a form letter comprising the following characters "Dear Mr. Sa, We are pleased to inform you that your loan was approved. Please see the attached procedure to secure your loan. Regards, Acme Bank." The character count for each character of the first document may be:

| Character | Count |
| --- | --- |
| white space | 27 |
| , | 2 |
| . | 4 |
| A | 1 |
| B | 1 |
| D | 1 |

-continued

| Character | Count |
| --- | --- |
| M | 1 |
| P | 1 |
| R | 1 |
| S | 1 |
| W | 1 |
| a | 14 |
| c | 4 |
| d | 5 |
| e | 18 |
| f | 1 |
| g | 1 |
| h | 3 |
| i | 1 |
| k | 1 |
| l | 4 |
| m | 2 |
| n | 4 |
| o | 10 |
| p | 4 |
| r | 11 |
| s | 6 |
| t | 7 |
| u | 5 |
| v | 1 |
| w | 1 |
| y | 3 |

A second document may be a form letter comprising the following characters "Dear Mr. Ji, We are pleased to inform you that your loan was approved. Please see the attached procedure to secure your loan. Regards, Acme Bank." The character count for each character of the second document may be:

| Character | Count |
| --- | --- |
| white space | 27 |
| , | 2 |
| . | 4 |
| A | 1 |
| B | 1 |
| D | 1 |
| J | 1 |
| M | 1 |
| P | 1 |
| R | 1 |
| W | 1 |
| a | 13 |
| c | 4 |
| d | 5 |
| e | 18 |
| f | 1 |
| g | 1 |
| h | 3 |
| i | 2 |
| k | 1 |
| l | 4 |
| m | 2 |
| n | 4 |
| o | 10 |
| p | 4 |
| r | 11 |
| s | 6 |
| t | 7 |
| u | 5 |
| v | 1 |
| w | 1 |
| y | 3 |

When comparing the first and second documents there may be calculations for the character count comparison, C, the character variance comparison, V, and the missing character count, MC. The character count comparison, C, may be approximately zero point nine eight (0.98) because the first and second documents have nearly the same count of characters in common with the exception of "a" and "i." As shown, documents that are similar may have character count comparisons that approach one (1). The character variance comparison, V, may be approximately zero point zero zero zero two (0.0002) because the difference between character counts of the first and second documents comprise one character count difference for "a" and "i" respectively. As shown, documents that are similar may have character variance comparisons that approach zero (0). The missing character count, MC, between the first document and second document may be one (1) because there is one character, "J," which is in the second document and not in the first document.

$C_0$—threshold value for C.
$V_0$—threshold value for V.
$MC_0$—threshold value for MC.
$W_V$—weighted value for variance comparison.
$W_C$—weighted value for character comparison.
$W_{MC}$—weighted value for missing characters.
$W_T$—total weight.
$W_T = W_V + W_C + W_{MC}$
M—a percentage match for two documents. The character comparison, variance comparison, and missing characters may be combined in a weighted average function to determine the percentage match for two documents.

$$M = \frac{\left(W_V * \left(1 - \left(\frac{V}{V_0}\right)\right)\right) + \left(W_C * \left(1 - \left(\frac{|1-C|}{C_0}\right)\right)\right) + \left(W_{MC} * \left(1 - \left(\frac{MC}{MC_0}\right)\right)\right)}{W_T}$$

In some embodiments, there may be variations of the weighted average function. For example:

| $W_V$ | $W_C$ | $W_{MC}$ | $W_T$ |
|---|---|---|---|
| 1 | 1 | 1 | 3 |
| 2 | 1 | 1 | 4 |
| 1 | 2 | 1 | 4 |
| 1 | 1 | 2 | 4 |
| 2 | 2 | 1 | 5 |
| 1 | 2 | 2 | 5 |
| 2 | 1 | 2 | 5 |
| 3 | 1 | 1 | 5 |
| 1 | 3 | 1 | 5 |
| 1 | 1 | 3 | 5 |
| 3 | 2 | 1 | 6 |
| 3 | 1 | 2 | 6 |
| 1 | 3 | 2 | 6 |
| 2 | 3 | 1 | 6 |
| 1 | 2 | 3 | 6 |
| 2 | 1 | 3 | 6 |
| 3 | 3 | 1 | 7 |
| 3 | 1 | 3 | 7 |
| 1 | 3 | 3 | 7 |

In some embodiments, the threshold values, $C_0$, $V_0$, and/or $MC_0$ may be set to values that reduce the amount of invalid data while not inadvertently discarding valid data as well. The threshold values may be determined by running the matching formula in several configurations against documents that have already been grouped, and then examining the relative match rates to determine the thresholds. The thresholds may vary based on the length of documents being grouped. For example, one page to one hundred page documents. The thresholds may vary based on the type of documents being grouped. For example, loan documents, emails, and/or contracts.

In some embodiments, there may be variations of the threshold values for $C_0$, $V_0$, and/or $MC_0$. For example:

| $C_0$ | $V_0$ | $MC_0$ |
|---|---|---|
| 0.1 | 0.1 | 10 |
| 0.1 | 0.2 | 20 |
| 0.1 | 0.3 | 30 |
| 0.1 | 0.4 | 40 |
| 0.1 | 0.5 | 50 |
| 0.1 | 0.6 | 60 |
| 0.1 | 0.7 | 70 |
| 0.1 | 0.8 | 80 |
| 0.1 | 0.9 | 90 |
| 0.2 | 0.1 | 100 |
| 0.2 | 0.2 | 10 |
| 0.2 | 0.3 | 20 |
| 0.2 | 0.4 | 30 |
| 0.2 | 0.5 | 40 |
| 0.2 | 0.6 | 50 |
| 0.2 | 0.7 | 60 |
| 0.2 | 0.8 | 70 |
| 0.2 | 0.9 | 80 |
| 0.3 | 0.1 | 90 |
| 0.3 | 0.2 | 100 |
| 0.3 | 0.3 | 10 |
| 0.3 | 0.4 | 20 |
| 0.3 | 0.5 | 30 |
| 0.3 | 0.6 | 40 |
| 0.3 | 0.7 | 50 |
| 0.3 | 0.8 | 60 |
| 0.3 | 0.9 | 70 |
| 0.4 | 0.1 | 80 |
| 0.4 | 0.2 | 90 |
| 0.4 | 0.3 | 100 |
| 0.4 | 0.4 | 10 |
| 0.4 | 0.5 | 20 |
| 0.4 | 0.6 | 30 |
| 0.4 | 0.7 | 40 |
| 0.4 | 0.8 | 50 |
| 0.4 | 0.9 | 60 |
| 0.5 | 0.1 | 70 |
| 0.5 | 0.2 | 80 |
| 0.5 | 0.3 | 90 |
| 0.5 | 0.4 | 100 |
| 0.5 | 0.5 | 10 |
| 0.5 | 0.6 | 20 |
| 0.5 | 0.7 | 30 |
| 0.5 | 0.8 | 40 |
| 0.5 | 0.9 | 50 |
| 0.6 | 0.1 | 60 |
| 0.6 | 0.2 | 70 |
| 0.6 | 0.3 | 80 |
| 0.6 | 0.4 | 90 |
| 0.6 | 0.5 | 100 |
| 0.6 | 0.6 | 10 |
| 0.6 | 0.7 | 20 |
| 0.6 | 0.8 | 30 |
| 0.6 | 0.9 | 40 |
| 0.7 | 0.1 | 50 |
| 0.7 | 0.2 | 60 |
| 0.7 | 0.3 | 70 |
| 0.7 | 0.4 | 80 |
| 0.7 | 0.5 | 90 |
| 0.7 | 0.6 | 100 |
| 0.7 | 0.7 | 10 |
| 0.7 | 0.8 | 20 |
| 0.7 | 0.9 | 30 |
| 0.8 | 0.1 | 40 |
| 0.8 | 0.2 | 50 |
| 0.8 | 0.3 | 60 |
| 0.8 | 0.4 | 70 |
| 0.8 | 0.5 | 80 |
| 0.8 | 0.6 | 90 |
| 0.8 | 0.7 | 100 |
| 0.8 | 0.8 | 10 |
| 0.8 | 0.9 | 20 |
| 0.9 | 0.1 | 30 |
| 0.9 | 0.2 | 40 |
| 0.9 | 0.3 | 50 |

-continued

| $C_0$ | $V_0$ | $MC_0$ |
|---|---|---|
| 0.9 | 0.4 | 60 |
| 0.9 | 0.5 | 70 |
| 0.9 | 0.6 | 80 |
| 0.9 | 0.7 | 90 |
| 0.9 | 0.8 | 100 |
| 0.9 | 0.9 | 10 |

In some embodiments, the threshold values, such as, but not limited to, $C_0$, $V_0$, and/or $MC_0$, may be determined by the following process and/or method. There may be an initial sample set of documents. For example, one or two hundred thousand random documents may be selected. The sample set of documents may have been manually indexed, identified, and/or organized. The grouping system may be run against the sample set of documents, with varying threshold values, such as, but not limited to, the above listed threshold values. To determine the thresholds, the results may be compared to the manual indexing, identification, and/or organization such that a sufficient number and/or percentage of the documents were matched, indexed, identified, and/or organized. For example, thresholds may be determined when ninety eight percent and/or above of the sample documents are matched, indexed, identified, and/or organized compared to the manual indexing of the sample set of documents.

In some embodiments, the thresholds may vary depending on the sample set of documents selected. However, with a sufficient diverse and/or representative set of sample documents, the thresholds may not vary that much. In some embodiments, there may variable thresholds based on different classifications, such as, but not limited to, loan documents, emails, and/or contracts.

Figure 7A:
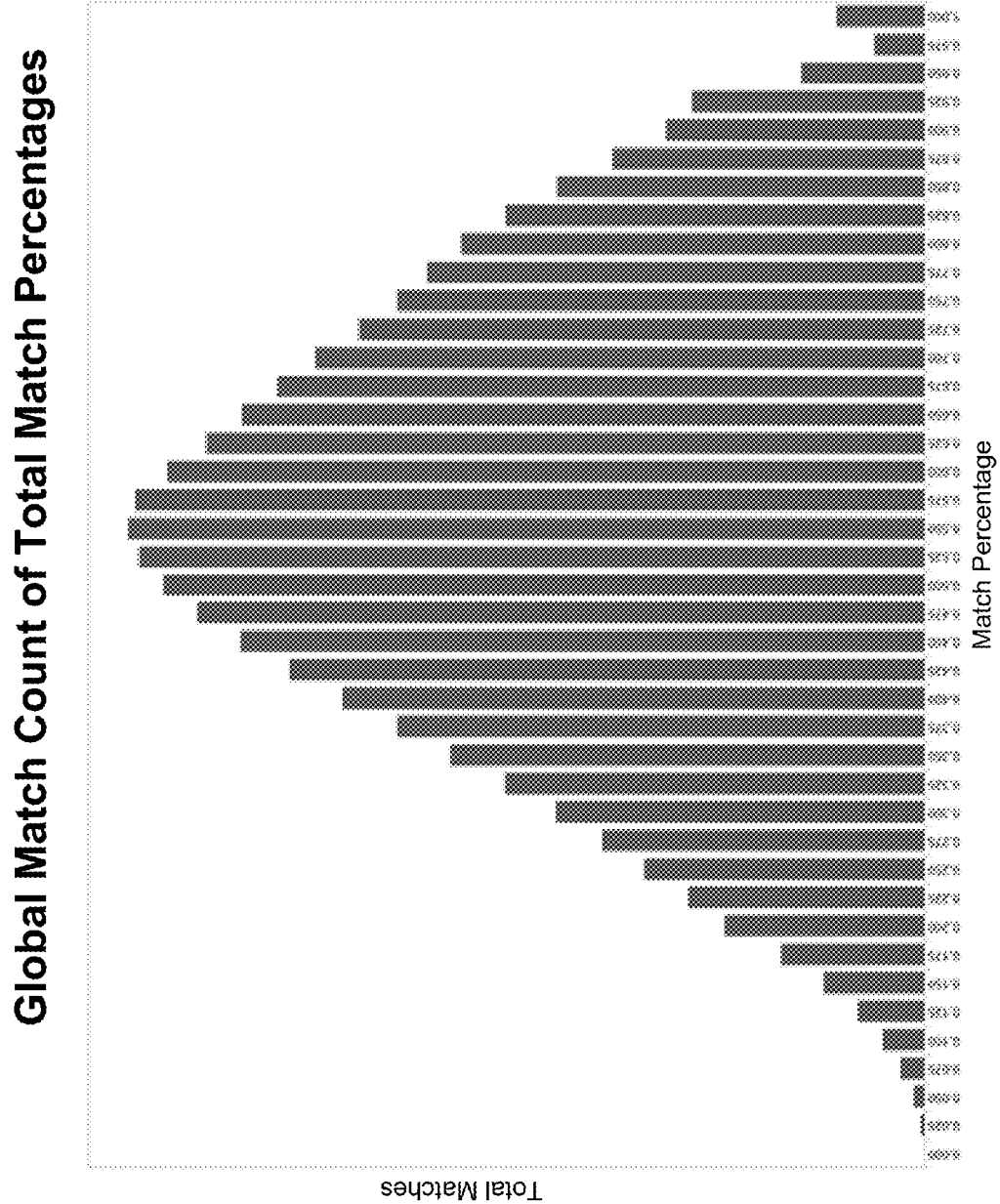
FIG. 7A is a diagram illustrating global match statistics according to some embodiments.

FIG. 7A is a diagram that illustrates some grouping systems' global match statistics in accordance with some embodiments. FIG. 7A illustrates a global match count of total match percentages. For example, in some embodiments, the total match percentage of zero point five five zero (0.550) had the highest global match count. As shown in FIG. 7A, in some embodiments, as the percentage match increases after zero point five five zero (0.550), the number of matches rapidly diminishes.

FIG. 7A illustrates statistical analyses that may be useful in tuning the grouping system in some embodiments. For example, since there may be a drop off after the total match percentage of zero point five five zero (0.550), the grouping system's thresholds may be tuned to increase the total match percentages. A drop off may be indicated by a change in slope on the histogram. In some embodiments, total match percentages of zero point six, zero point seven, etc., may be desirable. FIG. 7A may be used for other reasons. For example, each total match percentage may be a bucket of results that warrants further inspection and/or review by a human operator.

In some embodiments, the statistical match records of FIG. 7A is based on a matching formula that uses any combination of character comparisons, character variance comparisons, and missing character comparisons.

Figure 7B:
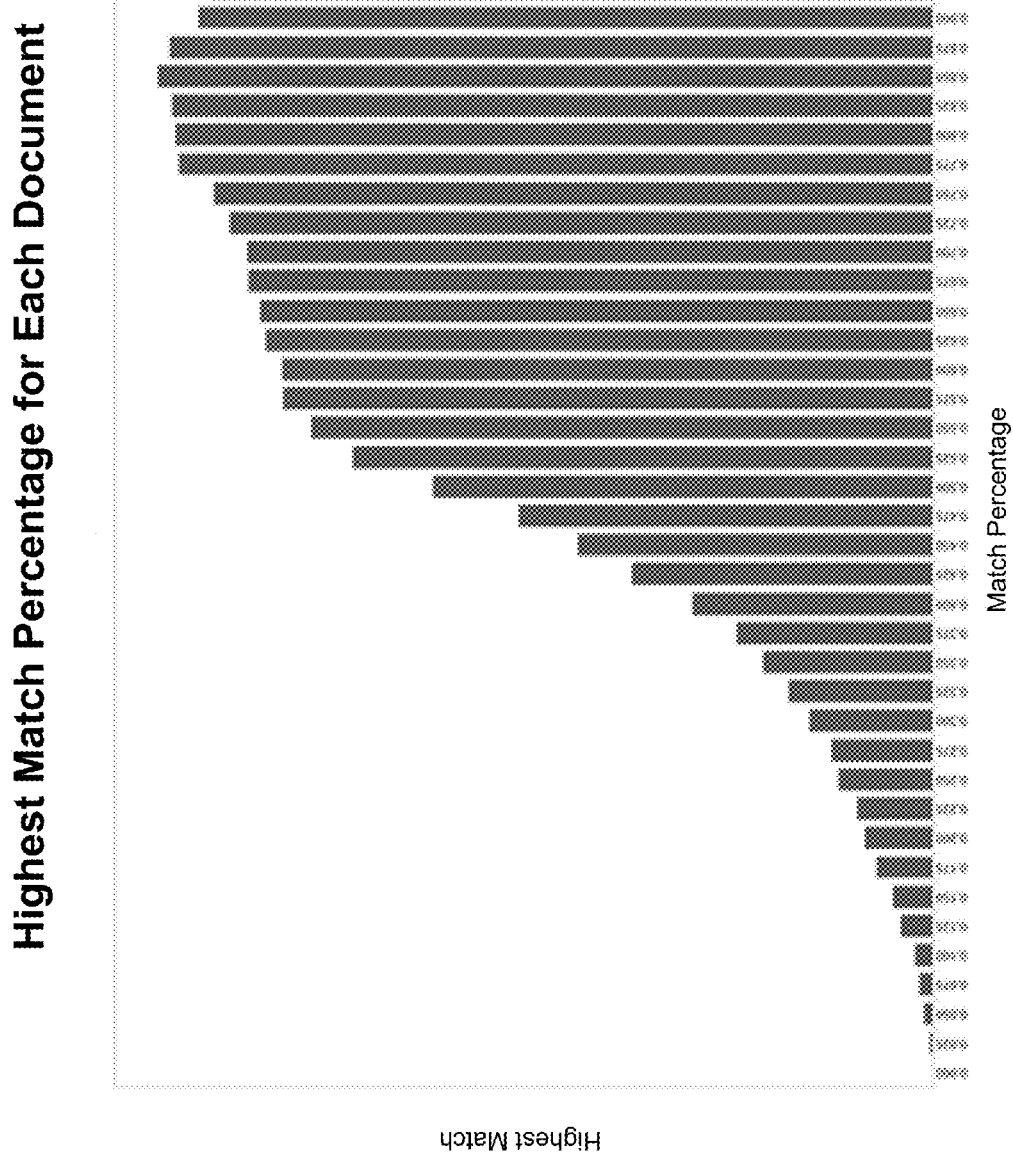
FIG. 7B is a diagram illustrating highest match statistics according to some embodiments.

FIG. 7B is a diagram that illustrates some grouping systems' match record statistics for the highest match percentage for each document in accordance with some embodiments. For example, in some embodiments, there may be a drop off below the zero point five five zero (0.550) mark of highest matches, which may indicate less useful matches being potentially lost by the thresholds of some embodiments.

FIG. 7B illustrates statistical analyses that may be useful in determining a floor threshold value for a percentage match. For example, in FIG. 7B, the drop off shown before zero point five five zero (0.550), indicates that including more match results from a lower threshold may have a diminishing benefit. Thus, a threshold above 0.55 may be useful for this set of documents.

In some embodiments, the statistical match records of FIG. 7B is based on a matching formula that uses any combination of character comparisons, character variance comparisons, and missing character comparisons.

FIG. 7A and/or FIG. 7B illustrate statistical analyses that may be useful in determining threshold values for $C_0$, $V_0$, and/or $MC_0$. After running the matching formula in several configurations against documents, one may use statistical analyses as illustrated by FIG. 7A and/or FIG. 7B. For example, a highest document match histogram, similar to FIG. 7B, which indicates evenly distributed matches among total match percentages, unlike what may be shown in FIG. 7B, may indicate poor threshold values since there may be no correlation between percentage match and likelihood of a highest match found. A global match count histogram, similar to FIG. 7A, which indicates evenly distributed match counts among match percentages below zero point five five zero (0.550), unlike what may be shown in FIG. 7A, may indicate poor threshold values. For example, since the threshold for percentage match may have to be set lower, this may conflict with a highest document match histogram, similar to FIG. 7B, which indicates low correlation of a highest match from a lower threshold.

In some embodiments, there may be variations of the threshold values for $C_0$, $V_0$, and/or $MC_0$. In some embodiments, there may be different threshold values depending on a first pass categorization of the document. For example, a first pass categorization may group documents into loan appraisals and/or business contracts. Following a first categorization, a second pass categorization may occur based on different thresholds from the categories of loan appraisals and/or business contracts.

Viewing Document Groups

In some embodiments, there is a computerized display unit for viewing document groups. For example, the display unit displays document groups in a table format. The display unit may be configured to display visual representations of groups. For example, the display unit displays document groups in clusters of documents. Documents may be represented by a document name, index, and/or unique identifier. A user may then view the document groups through the display unit. Viewing cluster of documents may be useful because of the volume and/or number of grouped documents may be so large that visualizations and/or user interfaces to analyze the groupings and/or clusters by a human operator may be desirable.

Figure 8:
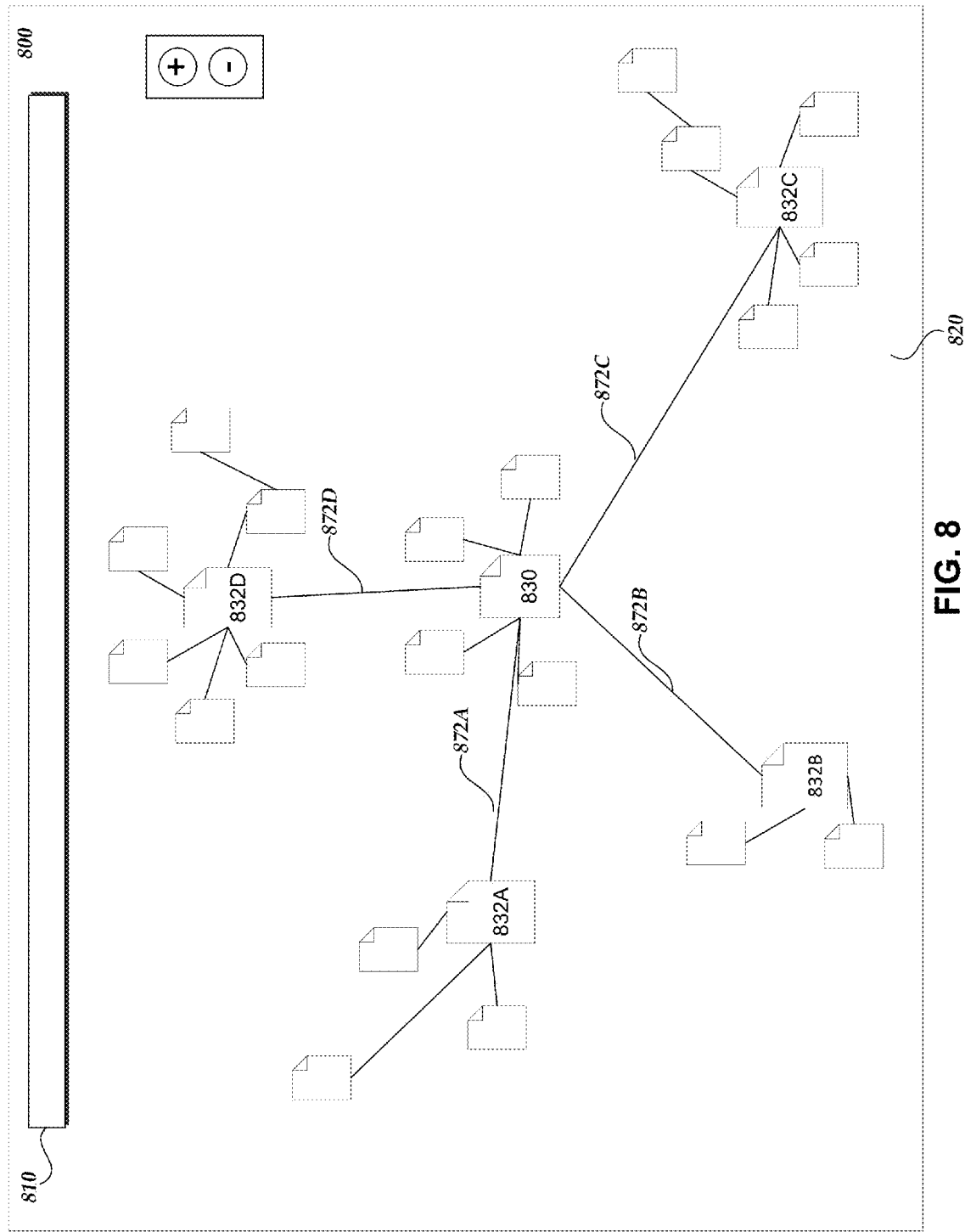
FIG. 8 illustrates an example user interface for viewing document groups within the grouping system, according to some embodiments of the present disclosure.

FIG. 8 illustrates example user interfaces of the grouping system, according to some embodiments of the present disclosure. In some embodiments, the user interfaces described below may be displayed in any suitable computer system and/or application, for example, in a web browser window and/or a standalone software application, among others. Additionally, the functionality and/or user interfaces of the system as shown in FIG. 8 may be implemented in one or more computer processors and/or computing devices, as is described with reference to FIG. 9.

Referring to FIG. 8, the example user interface 800 comprises a search box 810 and/or a document display area 820. A human operator by typing and/or entering data into the search box 810 may load, lookup, retrieve, and/or search for one or more documents. The user interface 800 may display documents in clusters, which may correspond to the matching and/or combined score between two or more documents based on, such as, but not limited to, character counts, character count variances, total characters, missing character counts, and/or other character features.

In some embodiments, starting and/or initializing the user interface 800 may display all of the grouped documents and/or provide the human operator with the option to select a grouping of documents to view. For example, document 830 may be displayed. The other documents 832 (including documents 832A, 832B, 832C and/or 832D) may be displayed automatically. The one or more connections 872 (including links 872A, 872B, 872C, and/or 872C) may display relationships between the document 830 and related documents 832. For example, the connections between document 830 and documents 832 may correspond to the similarity and/or relatedness between the documents. The user interface 800 may be configured to display large numbers of documents and/or clusters, such as, but not limited to, hundreds of thousands of documents and/or clusters.

In some embodiments, the connections and/or clusters of documents may be determined by one or more least path and/or minimum spanning tree algorithms collectively referred to herein as the "MST algorithm." For example, the relative distance between two documents and/or relative length of the connection between two documents may indicate the relatedness of two documents and/or the combined matching score between two documents. In the example, document 830 may be more closely related to document 832A than document 832C, which may be indicated by the relative distance and/or length of connections between the respective documents. In some embodiments, one or more algorithms may be used to generate the clusters and/or minimum spanning trees such as, but not limited to, Dijkstras, Prim, Kruskals, and/or some combination thereof. For example, the MST algorithm may comprise: initialize a tree with a single vertex, chosen arbitrarily from the graph; grow the tree by one edge (of the edges that connect the tree to vertices not yet in the tree, find the minimum-weight edge, and transfer it to the tree); and repeat the second step until all vertices are in the tree. In some embodiments, the MST algorithm may comprise: assign to every node a tentative distance value—set it to zero for our initial node and to infinity for all other nodes; mark all nodes unvisited; set the initial node as current; create a set of the unvisited nodes called the unvisited set consisting of all the nodes; for the current node, consider all of its unvisited neighbors and/or calculate their tentative distances; when finished considering all of the neighbors of the current node, mark the current node as visited and remove it from the unvisited set; if the destination node has been marked visited (when planning a route between two specific nodes) and/or if the smallest tentative distance among the nodes in the unvisited set is infinity then stop; and select the unvisited node that is marked with the smallest tentative distance, and set it as the new current node, then go back to step three.

In addition to visually searching and/or showing data objects and/or relationships between data objects, the user interface 800 may allow various other manipulations. For example, documents may be inspected (e.g., by viewing properties and/or associated data of the documents), filtered (e.g., narrowing the universe of documents into sets and subsets by properties or relationships), and statistically aggregated (e.g., numerically summarized based on summarization criteria), among other operations and visualizations.

Implementation Mechanisms

Computing device(s) are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
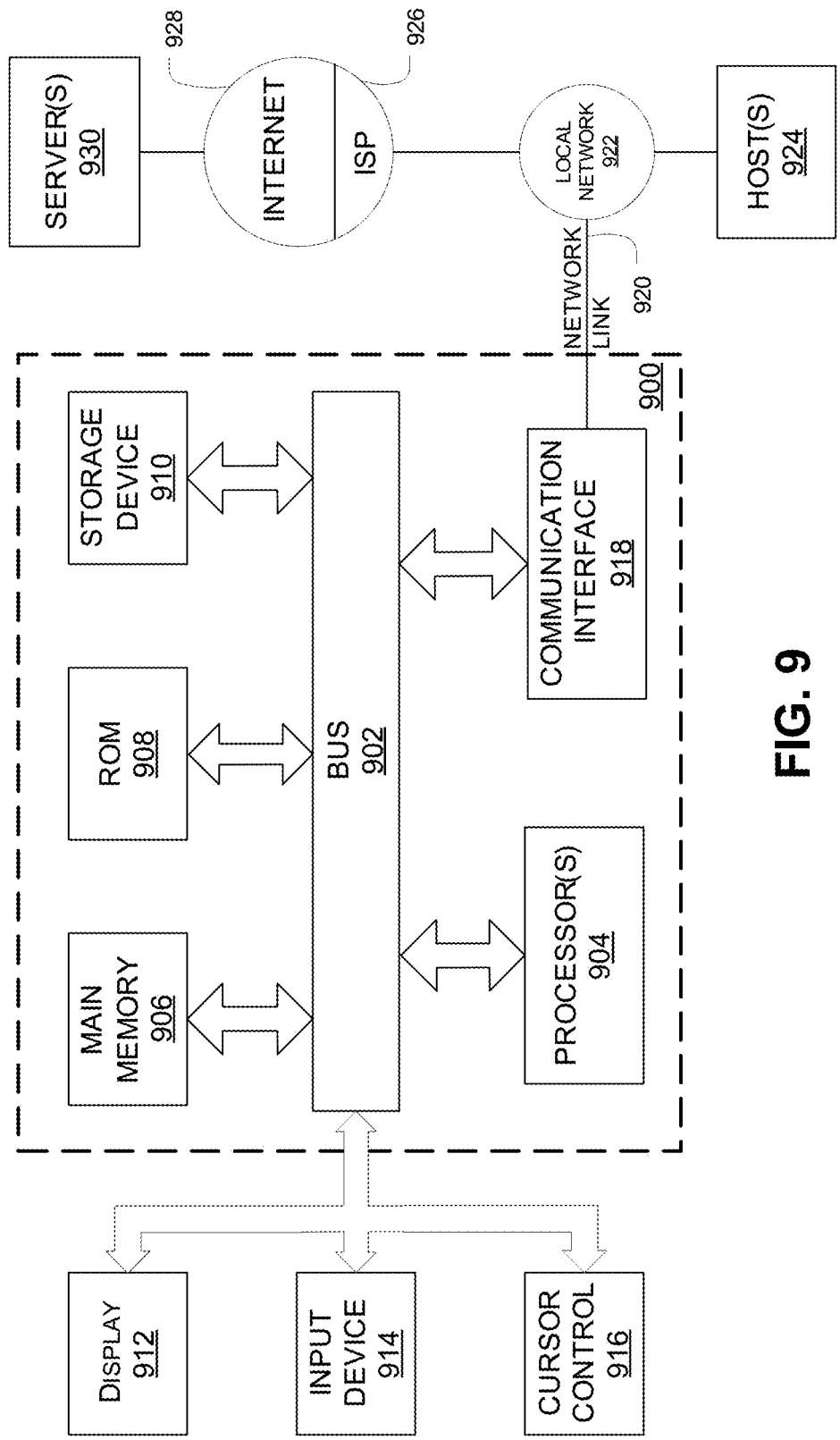
FIG. 9 is a diagram illustrating a computer system with which certain embodiments discussed herein may be implemented.

For example, FIG. 9 is a block diagram that illustrates a computer system 900 upon which an embodiment may be implemented. For instance, the computer system 900 may execute software, e.g., standalone software applications, applications within browsers, network applications, etc., whether by the particular application, the operating system, or otherwise. Any of the systems discussed herein may be performed by the computing system 900 and/or a similar computing system having some or all of the components discussed with reference to FIG. 9.

Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by hardware processor(s) 904. Such instructions, when stored in storage media accessible to hardware processor(s) 904, render computer system 900 into a special-purpose machine that is customized to perform the operations specified in the instructions. Such instructions, as executed by hardware processors, may implement the methods and systems described herein for grouping documents.

Computer system 900 further includes a read only memory (ROM) 908 or other static storage device coupled to bus 902 for storing static information and instructions for processor(s) 904. A storage device 99, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display or touch screen, for displaying information to a computer user. An input device 914 is coupled to bus 902 for communicating information and command selections to processor 504. One type of input device 914 is a keyboard including alphanumeric and other keys. Another type of input device 914 is a touch screen. Another type of user input device is cursor control 916, such as a mouse, a trackball, a touch screen, or cursor direction keys for communicating direction information and command selections to processor 904 and for controlling cursor movement on display 912. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software modules, possibly having entry and exit points, written in a programming language, such as, but not limited to, Java, Lua, C, C++, or C#. A software module may be compiled and linked into an executable program, installed in a dynamic link library, or may be written in an interpreted programming language such as, but not limited to, BASIC, Perl, or Python. It will be appreciated that software modules may be callable from other modules or from themselves, and/or may be invoked in response to detected events or interrupts. Software modules configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the instructions described herein refer to logical modules that may be combined with other modules or divided into sub-modules despite their physical organization or storage.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor(s) 904 for execution. For example, the instructions may initially be carried on a magnetic disk or solid state drive of a remote computer. The remote computer may load the instructions into its dynamic memory and send the instructions over a telephone or cable line using a modem. A modem local to computer system 900 may receive the data on the telephone or cable line and use an infra-red transmitter to convert the data to an infra-red signal. An infra-red detector can receive the data carried in the infra-red signal and appropriate circuitry can place the data on bus 902. Bus 902 carries the data to main memory 906, from which the processor(s) 904 retrieves and executes the instructions. The instructions received by main memory 906 may retrieve and execute the instructions. The instructions received by main memory 906 may optionally be stored on storage device 910 either before or after execution by processor(s) 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to be communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor(s) 904 as it is received, and/or stored in storage device 910, or other non-volatile storage for later execution.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
   a computing system comprising one or more computing devices having one or more hardware processors, the computing system programmed, via executable code instructions, to at least:
   receive, over a network, a plurality of documents from at least a second computing device;
   select a first document and a second document from the plurality of documents, wherein each document of the first document and the second document comprises distinct character types;
   determine a first indicator based on at least: (a) a number of distinct character type occurrences in both the first document and the second document, (b) differences in a number of occurrences of distinct character types in both the first document and the second document, and (c) a number of distinct character type occurrences in the first document and not in the second document;
   compare the first indicator to a threshold indicator to determine a match between the first document and the second document;
   in response to said determination, generate a user interface comprising representations of the first document and the second document in a cluster; and
   transmit the user interface for display to a user.

2. The system of claim 1, wherein the one or more computing devices are further programmed to:
   determine a second indicator based on at least a number of distinct character type occurrences in the first document and a third document, and wherein the cluster further comprises a representation of the third document based on at least the second indicator.

3. The system of claim 1, wherein the first indicator comprises a determining relationship M between the first document and the second document substantially as:

$$M = \frac{\left(W_V * \left(1 - \left(\frac{V}{V_0}\right)\right)\right) + \left(W_C * \left(1 - \left(\frac{|1-C|}{C_0}\right)\right)\right) + \left(\frac{W_{MC} *}{\left(1 - \left(\frac{MC}{MC_0}\right)\right)}\right)}{W_T},$$

where $W_V$, $V_0$, $W_C$, $C_0$, $W_{MC}$, $MC_0$, and $W_T$ are constants;
   C corresponds to the number of distinct character type occurrences in both the first document and the second document;
   V corresponds to the differences in the number of occurrences of distinct character types in both the first document and the second document; and
   MC corresponds to the number of distinct character type occurrences in the first document and not in the second document.

4. The system of claim 1, wherein the one or more computing devices are further programmed to:
   generate one or more clusters based on at least each document of the plurality of documents corresponding to a node, and wherein the one or more clusters are generated further based on at least selecting an edge between two nodes based at least in part on an indicator representing a match between the two nodes, and wherein the user interface comprises the one or more clusters.

5. The system of claim 1, wherein the one or more computing devices are further programmed to:
   receive, via the generated user interface, a selection of a representation of the first document; and
   transmit properties associated with the selected representation of the first document for display to the user.

6. The system of claim 1, wherein the one or more computing devices are further programmed to:
   receive, via the generated user interface, user input;
   update the user interface by removing at least a representation of the first document from the one or more clusters based on at least the user input; and
   transmit the updated user interface for display to the user.

7. The system of claim 2, wherein the cluster further comprises a first connection between the representations of the first document and the second document, and a second connection between the representations of the first document and the third document, and wherein a length of the first connection is based on at least the first indicator, and wherein a length of the second connection is based on at least the second indicator.

8. The system of claim 1, wherein the user interface further comprises at least one of statistics associated with the plurality of documents or numerical summaries associated with the plurality of documents for display to the user.

9. A system comprising:
a computing system comprising one or more computing devices having one or more hardware processors, the computing system programmed, via executable code instructions, to at least:
receive, over a network, a plurality of documents from at least a second computing device, wherein each document of the plurality of documents comprises distinct character types;
select a first document from the plurality of documents;
determine, for each document from a subset of the plurality of documents, an indicator based on at least: (a) a number of distinct character type occurrences in both the first document and the document from the subset of the plurality of documents, (b) differences in a number of occurrences of distinct character types in both the first document and the document from the subset of the plurality of documents, and (c) a number of distinct character type occurrences in the first document and not in the document from the subset of the plurality of documents;
compare the indicator to a threshold indicator to determine a match between the first document and at least one document from the subset of the plurality of documents;
in response to said determination, generate a user interface to display the match; and
transmit the user interface for display to a user.

10. The system of claim 9, wherein the user interface further comprises one or more clusters comprising representations of the first document and the at least one document from the subset of the plurality of documents, wherein the one or more clusters further comprises a connection between the first document and the at least one document from the subset of the plurality of documents, and wherein the connection is selected based on at least the indicator.

11. The system of claim 9, wherein the indicator comprises a determining relationship M between the first document and the document from the subset of the plurality of documents substantially as:

$$M = \frac{\left(W_V * \left(1 - \left(\frac{V}{V_0}\right)\right)\right) + \left(W_C * \left(1 - \left(\frac{|1-C|}{C_0}\right)\right)\right) + \left(\frac{W_{MC} *}{\left(1 - \left(\frac{MC}{MC_0}\right)\right)}\right)}{W_T},$$

where $W_V$, $V_0$, $W_C$, $C_0$, $W_{MC}$, $MC_0$, and $W_T$ are constants;
C corresponds to the number of distinct character type occurrences in both the first document and the document from the subset of the plurality of documents;
V corresponds to the differences in the number of occurrences of distinct character types in both the first document and the document from the subset of the plurality of documents; and
MC corresponds to the number of distinct character type occurrences in the first document and not in the document from the subset of the plurality of documents.

12. The system of claim 10, wherein the one or more clusters are generated based on at least each document of the plurality of documents corresponding to a node in the one or more clusters, and wherein the one or more clusters are generated further based on at least selecting an edge between two nodes based at least in part on a value associated with the indicator as compared to other indicator values.

13. The system of claim 10, wherein the one or more computing devices are further programmed to:
receive, via the generated user interface, user input;
update the user interface by removing at least the first document from the one or more clusters based on the user input; and
transmit the updated user interface for display to the user.

14. The system of claim 10, wherein a length of the connection is based at least on the indicator.

15. Non-transitory computer-readable storage storing executable instructions that instruct a computing system to perform operations comprising:
receiving, over a network, a plurality of documents from a computing device;
selecting a first document and a second document from the plurality of documents, wherein each document of the first document and the second document comprises distinct character types, and wherein the first document and the second document were retrieved from a second non-transitory computer-readable storage;
determining a first indicator based on at least: (a) a number of distinct character type occurrences in both the first document and the second document, (b) differences in a number of occurrences of distinct character types in both the first document and the second document, and (c) a number of distinct character type occurrences in the first document and not in the second document;
comparing the first indicator to a threshold indicator to determine a match between the first document and the second document;
in response to said determination, generating a user interface to display the match; and
transmitting the user interface for display to the user.

16. The non-transitory computer-readable storage of claim 15, wherein the user interface further comprises one or more clusters comprising representations of the first document and the second document, wherein the one or more clusters further comprises a connection between the first document and the second document, and wherein the connection is selected based on at least the first indicator.

17. The non-transitory computer-readable storage of claim 15, wherein the first indicator comprises a determining relationship M between the first document and the second document substantially as:

$$M = \frac{\left(W_V * \left(1 - \left(\frac{V}{V_0}\right)\right)\right) + \left(W_C * \left(1 - \left(\frac{|1-C|}{C_0}\right)\right)\right) + \left(\frac{W_{MC} *}{\left(1 - \left(\frac{MC}{MC_0}\right)\right)}\right)}{W_T},$$

where $W_V$, $V_0$, $W_C$, $C_0$, $W_{MC}$, $MC_0$, and $W_T$ are constants;
C corresponds to the number of distinct character type occurrences in both the first document and the second document;
V corresponds to the differences in the number of occurrences of distinct character types in both the first document and the second document; and MC corresponds to the number of distinct character type occurrences in the first document and not in the second document.

18. The non-transitory computer-readable storage of claim 16, the operations further comprising:
    receiving, via the generated user interface, a selection of a representation of the first document; and
    transmitting properties associated with the selected representation of the first document for display to the user.

19. The non-transitory computer-readable storage of claim 16, the operations further comprising:
    receiving, via the generated user interface, user input;
    updating the user interface by removing at least a representation of the first document from the one or more clusters based on the user input; and
    displaying the updated one or more user interfaces to the user.

20. The non-transitory computer-readable storage of claim 15, wherein the user interface further comprises at least one of statistics associated with the plurality of documents or numerical summaries associated with the plurality of documents for display to the user.

* * * * *